US012775426B2

(12) United States Patent
Lim et al.

(10) Patent No.: US 12,775,426 B2
(45) Date of Patent: Oct. 27, 2026

(54) COMMUNICATION WITH ADDITIONAL FUNCTION PROVISION SERVER THROUGH PROXY SERVER

(71) Applicant: Hewlett-Packard Development Company, L.P., Spring, TX (US)

(72) Inventors: Yeonjung Lim, Seongnam-si (KR); Giwon Seo, Seongnam-si (KR); Hyeongju Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 370 days.

(21) Appl. No.: 18/023,452

(22) PCT Filed: Jan. 29, 2021

(86) PCT No.: PCT/US2021/015634

§ 371 (c)(1),
(2) Date: Feb. 27, 2023

(87) PCT Pub. No.: WO2022/066204

PCT Pub. Date: Mar. 31, 2022

(65) Prior Publication Data

US 2023/0315356 A1 Oct. 5, 2023

(30) Foreign Application Priority Data

Sep. 24, 2020 (KR) ........................ 10-2020-0124265

(51) Int. Cl.
*G06F 3/12* (2006.01)
*H04L 9/40* (2022.01)

(52) U.S. Cl.
CPC .......... *G06F 3/1222* (2013.01); *G06F 3/1236* (2013.01); *G06F 3/1238* (2013.01); *H04L 63/205* (2013.01)

(58) Field of Classification Search
None
See application file for complete search history.

(56) References Cited

U.S. PATENT DOCUMENTS 7,752,292 B1 7/2010 Katzer
8,397,059 B1 * 3/2013 Ferguson .............. H04L 9/3271 713/168

(Continued)

FOREIGN PATENT DOCUMENTS

JP 2009-258917 A 11/2009
KR 10-2019-0014424 A 2/2019

*Primary Examiner* — Philip J Chea
*Assistant Examiner* — James Ross Hollister
(74) *Attorney, Agent, or Firm* — Foley & Lardner LLP

(57) ABSTRACT

An example image forming apparatus includes a communications unit to communicate with an additional function provision server, a memory to store information regarding an interface through which the additional function provision server is made accessible to provide an additional function, and a processor to attempt, with the information regarding the interface, to access the additional function provision server using a security scheme of the image forming apparatus, and forward the information regarding the interface via the communications unit to a proxy server which is to communicate using the security scheme of the additional function provision server, if there is a difference between the security scheme of the image forming apparatus and a security scheme of the additional function provision server.

12 Claims, 8 Drawing Sheets

(56) References Cited

U.S. PATENT DOCUMENTS

| | | | | |
|---|---|---|---|---|
| 10,003,600 | B2 | 6/2018 | Karunakaran et al. | |
| 2003/0009672 | A1 | 1/2003 | Goodman | |
| 2008/0139201 | A1 | 6/2008 | Frid-Nielsen et al. | |
| 2008/0209451 | A1* | 8/2008 | Michels | G06F 15/16 719/328 |
| 2009/0040548 | A1* | 2/2009 | Nakamura | G03G 15/5075 358/1.15 |
| 2013/0104226 | A1 | 4/2013 | Cohen | |
| 2015/0039886 | A1* | 2/2015 | Kahol | G06F 21/6218 713/165 |
| 2015/0244787 | A1* | 8/2015 | Fausak | H04L 67/56 709/203 |
| 2016/0164863 | A1 | 6/2016 | Hitchcock et al. | |
| 2016/0196130 | A1* | 7/2016 | Shimizu | G06F 21/572 717/168 |
| 2016/0234209 | A1* | 8/2016 | Kahol | G06F 16/958 |
| 2020/0015307 | A1* | 1/2020 | Naka | H04W 76/18 |
| 2020/0053062 | A1* | 2/2020 | Stuntebeck | H04L 63/0281 |
| 2020/0372174 | A1* | 11/2020 | Schenkein | G06F 21/6245 |

* cited by examiner

FIG. 6

| APPLICATION → ADDITIONAL FUNCTION PROVISION SERVER | |
|---|---|
| METHOD | POST |
| ADDRESS | (URL OF ADDITIONAL FUNCTION PROVISION SERVER) |
| HEADER | A |
| MESSAGE | α |

FIG. 7

| APPLICATION → PROXY SERVER | |
|---|---|
| METHOD | POST |
| ADDRESS | (URL OF PROXY SERVER) |
| HEADER | B |
| MESSAGE | α+β |

FIG. 8

| PROXY SERVER → ADDITIONAL FUNCTION PROVISION SERVER | |
|---|---|
| METHOD | POST |
| ADDRESS | (URL OF ADDITIONAL FUNCTION PROVISION SERVER) |
| HEADER | A |
| MESSAGE | α |

COMMUNICATION WITH ADDITIONAL FUNCTION PROVISION SERVER THROUGH PROXY SERVER

BACKGROUND

There exist different types of image forming apparatuses, including printers, scanners, photocopiers, facsimile machines, etc., as well as multi-function products (MFPs) that may provide a combination of functions, e.g., print, copy, scan, and fax functions.

In addition to such features, some image forming apparatuses enable additional functionality with an external server, also referred to hereinafter as an additional function provision server, which may be connected thereto through a network. The server may be a third-party server on the network.

Examples of the additional functionality, which is available based on the connection to the additional function provision server, include functions of downloading a file from the server to the image forming apparatus for printing, uploading a scan file from the image forming apparatus to the server, downloading the uploaded scan file from the server to the image forming apparatus for printing, and so forth.

BRIEF DESCRIPTION OF THE DRAWINGS

FIG. 6 shows application programming interface (API) information which may be forwarded from an image forming apparatus to an additional function provision server according to an example.

FIG. 7 shows API information which may be forwarded from an image forming apparatus to a proxy server according to an example.

FIG. 8 shows API information which may be forwarded from a proxy server to an additional function provision server according to an example.

DETAILED DESCRIPTION

Figure 1:
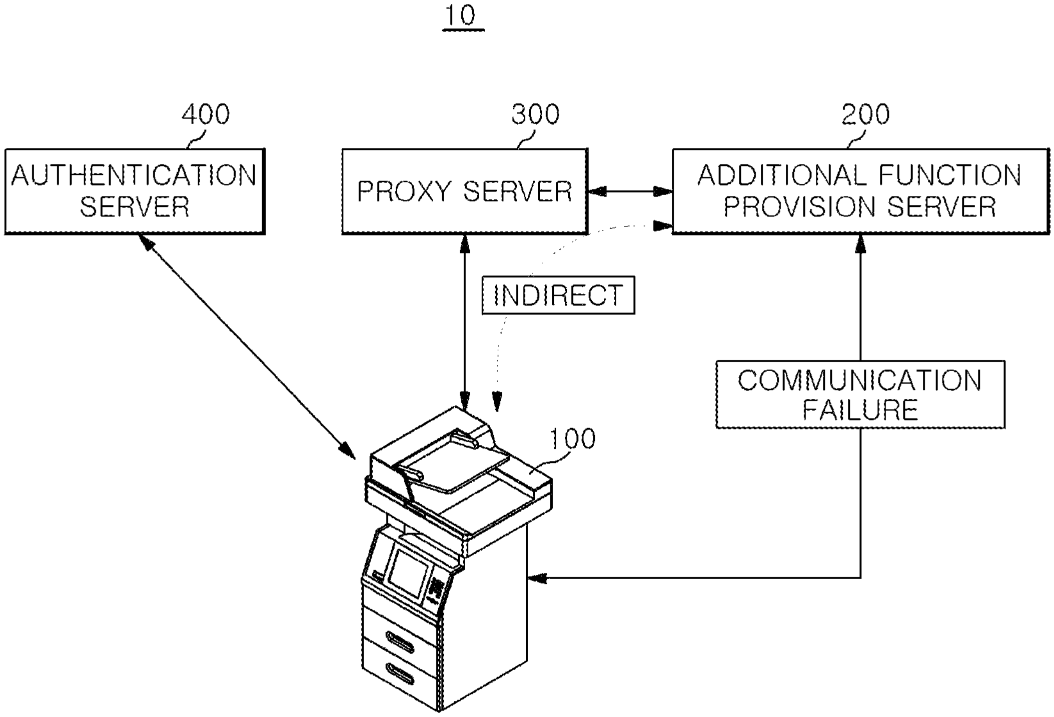
FIG. 1 is a block diagram illustrating a system including an image forming apparatus, an additional function provision server, a proxy server, and an authentication server according to an example.

Various examples of the present disclosure allow for implementation of additional functionality for a user of an image forming apparatus through communication between the image forming apparatus and an additional function provision server. In an example, such communication may include the use of an encrypted communication channel over which the image forming apparatus and the additional function provision server exchange data in a secure manner. For example, the image forming apparatus may encrypt scanned data with a certain security scheme and upload the encrypted data via the encrypted communication channel to the server. Likewise, the encrypted communication channel may be used for downloading data from the additional function provision server to the image forming apparatus. In various examples, the data may include secret or confidential material of a company, research institute, or other organizational entity, and/or private information or other material subject to restricted public availability.

In some examples, the encrypted communication channel or the security scheme therefor may be changed or upgraded over time to enhance the security. Such change or upgrade, however, may be implemented on the image forming apparatus and the additional function provision server at different points of time. For example, a security update may already be installed on the server while the image forming apparatus may have yet to be updated. This may result in a mismatch or difference between the security scheme of the image forming apparatus and that of the additional function provision server and, thus, a communication failure may occur. The difference between the respective security schemes may refer to a difference in type between their respective protocols, a difference in version between the respective protocols, a difference in type between their respective encryption schemes, a difference in version between the respective encryption schemes, or the like.

Various examples described herein facilitate access from an image forming apparatus to an additional function provision server in case there occurs a communication failure therebetween, so that the image forming apparatus may access additional functionality as provided by the additional function provision server. In some cases, upon the communication failure, a user or an administrator of the image forming apparatus may be prompted with a notification to establish an updated security scheme of the image forming apparatus.

Various terms used in the following examples are chosen from a terminology of commonly used terms in consideration of their function herein, which may be appreciated differently depending on an intention of a person skilled in the art, a precedent case, or an emerging new technology. In some cases, terms may be construed as set forth in the following examples. Accordingly, the terms used herein are to be defined consistently with their meanings in the context of the various examples, rather than simply by their plain and ordinary meaning.

The terms “comprising,” “including,” “having,” “containing,” etc. are used herein when specifying the presence of the elements listed thereafter. Unless otherwise indicated, these terms and variations thereof are not meant to exclude the presence or addition of other elements.

As used herein, the ordinal terms “first,” “second,” and so forth are meant to identify several similar elements. Unless otherwise specified, such terms are not intended to impose limitations, e.g., a particular order of these elements or of their use, but rather are used merely for referring to multiple elements separately. For instance, an element may be referred to in an example with the term “first” while the same element may be referred to in another example with a different ordinal number such as “second” or “third.” In such examples, the ordinal terms are not to limit the scope of the present disclosure. Also, the use of the term “and/or” in a list of multiple elements is inclusive of all possible combinations of the listed items, including any one or plurality of the items.

The term "image forming job" as used herein may encompass any of a variety of image-related jobs, such as a print job, a scan job, a photocopy job, a facsimile transmission job, and the like, that involve an operation of forming an image and/or other processing operation, e.g., creation, generation and/or transfer of an image file. Furthermore, an image forming job performed by an image forming apparatus may comprise various jobs related to printing, photocopying, scanning, faxing, storing, transmitting, coating, etc.

The term "image forming apparatus" as used herein may encompass any of a variety of apparatuses, such as a printer, a scanner, a photocopier, a facsimile machine, a multi-function product (MFP), and so on, that carries out an image forming job. In some examples, an image forming apparatus may be a two-dimensional (2D) or three-dimensional (3D) image forming apparatus.

The term "user" as used herein may refer to a person who manipulates an image forming apparatus to operate an image forming job. Further, the term "administrator" as used herein may refer to a person who has access to the entire functionality of an image forming apparatus. In some examples, one person may have both the roles of an administrator and a user.

Certain examples of the present disclosure will now be described with reference to the accompanying drawings. The various examples may, however, be implemented in many different forms and should not be construed as limited to the examples set forth herein. Rather, these examples are given in order to provide a better understanding of the scope of the present disclosure.

FIG. 1 is a block diagram illustrating a system including an image forming apparatus, an additional function provision server, a proxy server, and an authentication server according to an example.

Referring to FIG. 1, a system 10 includes an image forming apparatus 100, an additional function provision server 200, a proxy server 300, and an authentication server 400, all of which are interconnected via a network (not shown). Other examples of the system 10 are also contemplated, including the image forming apparatus 100.

In the illustrated example, the additional function provision server 200 provides a variety of additional functions for a user of the image forming apparatus 100. Such additional functions may include a function of an online storage service, which may also be referred to as a "web hard drive," and/or any other similar function. As an example, the additional function provision server 200 may receive and store a file from the image forming apparatus 100 through the network. Further, the additional function provision server 200 may provide a file stored thereon to the image forming apparatus 100, a terminal of the user, or any other desired device, on an as-needed basis. In this example, the additional function provision server 200 may be implemented on a computer including a communications unit to communicate over the network, a memory to store files, and a processor to operate for executing any of the functions discussed above or described below. In some cases, the additional function provision server 200 can be implemented on a server administered and operated by a third-party vendor.

The image forming apparatus 100 may be a single-function type of image forming apparatus, e.g., a single-function printer, scanner, copier, or facsimile machine, or an MFP which functions as a combination of some single-function image forming apparatuses. In the example of FIG. 1, the image forming apparatus 100 may "directly" access the additional function provision server 200 over the network (not shown) so as to implement an additional function as provided by the additional function provision server 200. The image forming apparatus 100 may also "indirectly" access the additional function provision server 200 over the network via, for example, a proxy server 300, so as to be served with (e.g., access) the additional function. In some cases, the image forming apparatus 100 may incorporate therein such additional function by executing an application installed on the image forming apparatus 100. Examples of these and other features of the image forming apparatus 100 are described in greater detail below.

In the illustrated example of FIG. 1, the proxy server 300 may communicate with the image forming apparatus 100 and with the additional function provision server 200. As an example, in order to communicate with the additional function provision server 200 over Hypertext Transfer Protocol Secure (HTTPS), the proxy server 300 may enter a handshaking stage during which the additional function provision server 200 and the proxy server 300 may verify each other and agree on a security scheme they will be using. In this way, even after the additional function provision server 200 has a modified or upgraded version of the security scheme, the proxy server 300 will still be able to communicate with the additional function provision server 200. In other examples, it may be determined with a mechanism other than the handshaking what security scheme is hosted on or supported by the additional function provision server 200. For instance, an administrator of the additional function provision server 200 may post a notice that its security scheme has been upgraded so that an administrator of the proxy server 300 may be prompted to apply therein the upgraded security scheme. Examples of these and other features of the proxy server 300 are described in greater detail below.

In the example of FIG. 1, if the installed application of the image forming apparatus 100 requests the additional function from the additional function provision server 200, the authentication server 400 performs an authentication based on whether the application, which may be referred to as the "requesting application," is a previously authenticated application or not. If the authentication is successful, the requesting application or the image forming apparatus 100 is provided access to the requested additional function from the additional function provision server 200 while any unauthenticated devices or applications are not. This may prevent confidential material stored in the additional function provision server 200 from being accessed by an unauthorized third party. In this regard, the authentication server 400 may include a memory to store a list of image forming apparatuses or applications that are allowed to access the additional function provision server 200, and a processor to authenticate based upon the list.

As noted above, the image forming apparatus 100 may access the additional function provision server 200 through the proxy server 300 so as to be served with an additional function. Such indirect access may be triggered if a direct access from the image forming apparatus 100 to the additional function provision server 200 fails. The unsuccessful direct access may occur, for instance, when a communication failure is caused by a difference between a security scheme of the image forming apparatus 100 and that of the additional function provision server 200 or by some other factors, for example, an error in a communication line or network infrastructure for connecting the image forming apparatus 100 and the additional function provision server 200, a difficulty in routing therebetween, etc.

For example, the difference between the respective security schemes may include a difference in type between a protocol of the security scheme of the image forming apparatus 100 and a protocol of the security scheme of the additional function provision server 200, a difference between versions of the respective protocols, a difference in type between an encryption scheme of the security scheme of the image forming apparatus 100 and an encryption scheme of the security scheme of the additional function provision server 200, and/or a difference between versions of the respective encryption schemes.

Figure 2:
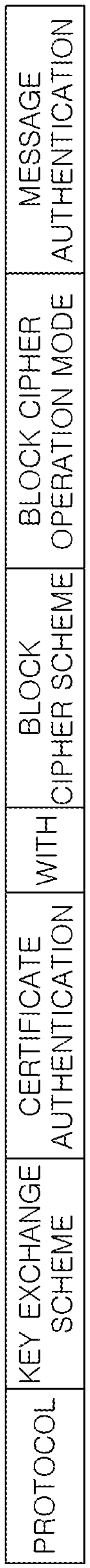
FIG. 2 is a schematic representation of a cipher suite for use between an image forming apparatus and an additional function provision server according to an example.

FIG. 2 is a schematic representation of a cipher suite for use between an image forming apparatus and an additional function provision server according to an example.

Referring to FIG. 2, an example cipher suite may include a supported protocol, a key exchange scheme, a certificate authentication scheme, a block cipher scheme, a block cipher operation mode, and a message authentication scheme.

The "Protocol" field may include an indication of a type of protocol, such as SSLv3, TLSv1, TLSv1.1, TLSv1.2, or the like, for use in encrypted communication. The "Key Exchange Scheme" field may include an indication of a mechanism, such as RSA, DH, DHE, ECDH, ECDHE, or the like, that enables two communicating parties of the communication to exchange keys. The "Certificate Authentication" field may include an indication of an algorithm, such as RSA, DSS, ECDSA, ANON, or the like, by which either one of the parties relies upon a certificate authority (CA) to verify whether a certificate held by the other party is to be trusted. The "Block Cipher Scheme" field may include an indication of an algorithm, such as 3DES, AES, AES128, or the like, for use in encrypting actual data in blocks for the communication. The "Block Cipher Operation Mode" field may include an indication of a block cipher algorithm to prevent any block of the data from being reconstructed by an unauthorized third party from its corresponding ciphertext. The "Message Authentication" field may include an indication of an integrity check of the block-wise encrypted messages.

In an example, the administrator of the additional function provision server 200 may modify or upgrade the above-mentioned protocol or encryption scheme to enhance or increase the security. In some circumstances, however, such modification or upgrade may already be applied to operate the additional function provision server 200 while the image forming apparatus 100 may have yet to be modified or upgraded accordingly. Thus, the operating protocol or security scheme of the additional function provision server 200 may be of a different type or version from that of the image forming apparatus 100. This may result in a communication failure therebetween and, thus, the attempted direct access from the image forming apparatus 100 to the additional function provision server 200 may fail.

In such a case, the image forming apparatus 100 may access the additional function provision server 200 via the proxy server 300 so as to access the additional function of the additional function provision server 200. Hence, the user of the image forming apparatus 100 may make use of the additional function, irrespective of whether the upgrade on the additional function provision server 200 is performed.

In addition, if the access to the additional function provision server 200 by the image forming apparatus 100 is made through the proxy server 300, the user or the administrator of the image forming apparatus 100 may be notified with an informational notification prompting to establish an upgraded security scheme of the image forming apparatus 100, upon which the additional function provision server 200 may agree as corresponding to its upgraded security scheme. Thus, it is possible to promote efficient maintenance and management of the image forming apparatus 100.

Additional examples of the image forming apparatus 100 will be discussed below.

Figure 3:
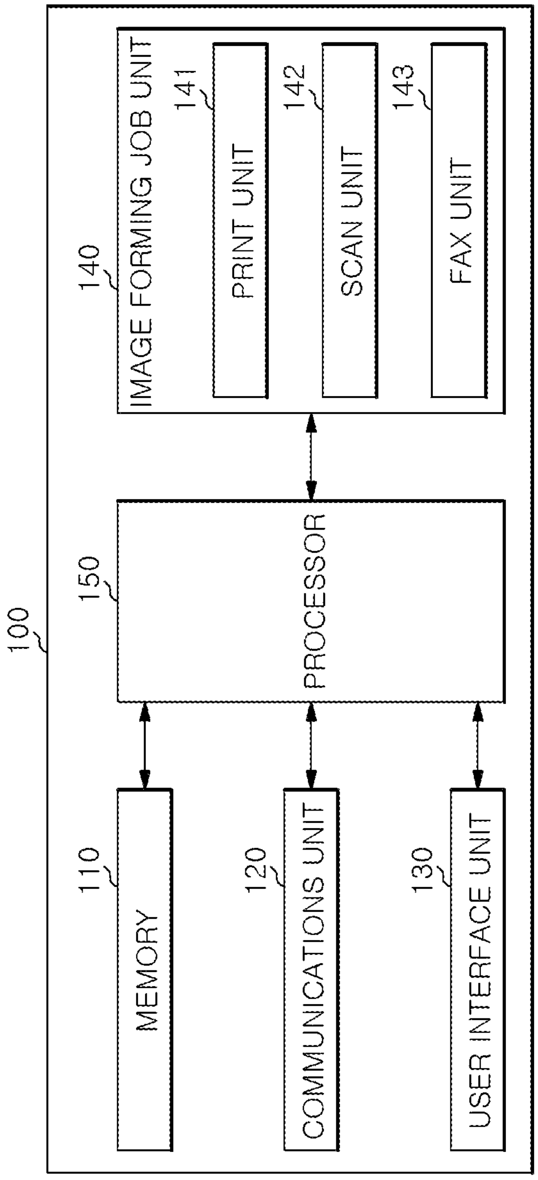
FIG. 3 is a block diagram illustrating an image forming apparatus according to an example.

FIG. 3 is a block diagram illustrating an image forming apparatus according to an example.

Referring to FIG. 3, the image forming apparatus 100 may include a memory 110, a communications unit 120, a user interface (UI) unit 130, an image forming job unit 140, and a processor 150. The image forming apparatus 100 may also include an additional component, e.g., a power supply unit to supply power to the above-mentioned components. In another example, the image forming apparatus 100 may include some of, but not all of, the components shown in FIG. 3. Still other examples are also contemplated.

The memory 110 may include any computer-readable storage medium that stores data in a non-transitory form. Thus, the memory 110 may be, for example, random access memory (RAM), read-only memory (ROM), and/or any other type of storage medium. The memory 110 may have stored therein a variety of information, for example, a set of instructions that are to be executed by the processor 150, access or communication-related information, a number of application programs, and/or other information.

The memory 110 may store information for use in accessing or communicating with the additional function provision server 200 and the proxy server 300. As an example, the access or communication-related information that pertains to the additional function provision server 200 may include information regarding an interface through which the additional function provision server 200 is made accessible to provide an additional function, for example, information regarding an application programming interface (API). The API information may include an API call method and an address or uniform resource locator (URL) of the additional function provision server 200. In addition, the access or communication-related information pertaining to the proxy server 300 may include an address of the proxy server 300.

The memory 110 may have stored or installed therein a certain application which operates to send to the additional function provision server 200 a request for an additional function and to receive a response thereto from the additional function provision server 200.

The communications unit 120 may communicate with the additional function provision server 200 and with the proxy server 300. The communications unit 120 may include a variety of communications modules (e.g., transceivers), for example, a wired communications module and/or a wireless communications module. The wired communications module may support Local Area Network (LAN), Universal Serial Bus (USB), High Definition Multimedia Interface (HDMI), or any other suitable type of wired communication technology. The wireless communications module may support Wireless Fidelity (Wi-Fi), Wi-Fi Direct, Bluetooth, Ultra-Wide Band (UWB), Long Term Evolution (LTE), Long Term Evolution-Advanced (LTE-A), Fifth Generation (5G), Near-Field Communication (NFC), or any other suitable type of wireless communication technology.

The communications unit 120 of the image forming apparatus 100 may attempt, by using the information regarding the API of the additional function provision server 200, to access the additional function provision server 200. In this example, if there is a difference in security scheme between the image forming apparatus 100 and the additional function provision server 200 at the time of the attempted communication, the image forming apparatus 100 fails to directly access the additional function provision server 200. In response thereto, the image forming apparatus 100 may access the additional function provision server 200 via the proxy server 300. To this end, the image forming apparatus 100 may have a pre-configured setting to communicate with the proxy server 300.

The UI unit 130 may include an input unit to receive a variety of user inputs, e.g., a user input to select an image forming job to be performed, a user input to select among various options related to the image forming job, a user input to execute the requesting application of the image forming apparatus 100, and the like. Examples of the input unit include a keyboard, a keypad, a physical button, a touch pad, a touch screen, and any other type of device that can receive a variety of forms of user input.

The UI unit 130 may also include an output unit to display a result of the image forming job and/or to output or provide a certain message or other information on, e.g., a status of the image forming apparatus 100. Examples of the output unit include a display panel, a speaker, and any other type of device that can provide a variety of outputs.

The image forming job unit 140 may perform an image forming job including, e.g., printing, copying, scanning, and/or facsimile transmission. In various examples, the image forming job unit 140 may include a print unit 141, a scan unit 142, and a fax unit 143, as shown in FIG. 3. In other examples, the image forming job unit 140 may include a subset of the above-listed components or include additional components for processing of other image forming jobs.

The print unit 141 may include a printing mechanism to form an image on a recording medium such as a sheet of paper. Various examples of the printing mechanism include an electro-photographic mechanism, an inkjet mechanism, a thermal transfer mechanism, a direct thermal mechanism, and the like.

The scan unit 142 may irradiate light onto a document and receive light reflected therefrom to read imagery therefrom. As an example, an image sensor such as a charge coupled device (CCD) type sensor, a contact-type image sensor (CIS), or any other suitable type of image sensor may be used therein for the image reading from the document. In various examples, the scan unit 142 may have a flatbed structure in which an image sensor is to move to read an image from a document page placed fixedly on a specific location, a document feed structure in which document sheets are to be fed to allow a fixedly-positioned image sensor to read images therefrom, or a combination thereof.

The fax unit 143 may include a component to scan an image and a component to print a received image file. These components may also be used by the scan unit 142 and the print unit 141, respectively. Further, the fax unit 143 may transfer a scanned image file to a destination or receive an image file from an external source.

The processor 150 may execute an instruction stored in the memory 110. The processor 150 may also read other information stored in the memory 110. In addition, the processor 150 may store information in the memory 110 and may update some information stored in the memory 110.

The processor 150 may control an operation of the image forming apparatus 100. In some examples, the processor 150 may be implemented with a central processing unit (CPU) or other processing circuitry to perform the example operations described herein.

The processor 150 may execute the above-mentioned requesting application. In an example, during the execution, the processor 150 may also operate some of the other components of the image forming apparatus 100.

The processor 150 may request the authentication server 400 to authenticate the requesting application. For example, the processor 150 may request the authentication server 400 to verify whether the application is a pre-authenticated application. If the authentication of the requesting application is successful, the application may be executed on the image forming apparatus 100. If the authentication is unsuccessful, the processor 150 may terminate the execution of the requesting application.

The processor 150 may perform a control operation to attempt to access the additional function provision server 200. The access may be attempted with the execution of the requesting application and may conform to the security scheme of the image forming apparatus 100.

In a case in which a failure of the attempted access is caused by a difference between the security scheme of the image forming apparatus 100 and that of the additional function provision server 200, the processor 150 may send to the proxy server 300 a request for delegated communication with the additional function provision server 200. In an example, when requesting such delegated communication, the processor 150 may perform a control operation to forward, to the proxy server 300, the information regarding the interface of the additional function provision server 200. In addition to the forwarding of the interface information, the processor 150 may perform a control operation to forward a message originally destined for the additional function provision server 200 to the proxy server 300.

The additional function provision server 200 may provide a result of performing a task related to the additional function. The result may be received at the image forming apparatus 100 through the proxy server 300, as opposed to directly from the additional function provision server 200. In such a case, the processor 150 may control the UI unit 130 to output or display a message prompting to establish an updated security scheme of the image forming apparatus 100. In an example, the message may be a text or sound message in the form of a simple alarm. In another example, the message may prompt for updating of an application or a firmware program of the image forming apparatus 100.

Various other example operations of the processor 150 are further described below.

An example of the proxy server 300 will be described. As discussed earlier, the proxy server 300 may communicate with the image forming apparatus 100 and with the additional function provision server 200. Further, the proxy server 300 may relay communications between the image forming apparatus 100 and the additional function provision server 200.

Figure 4:
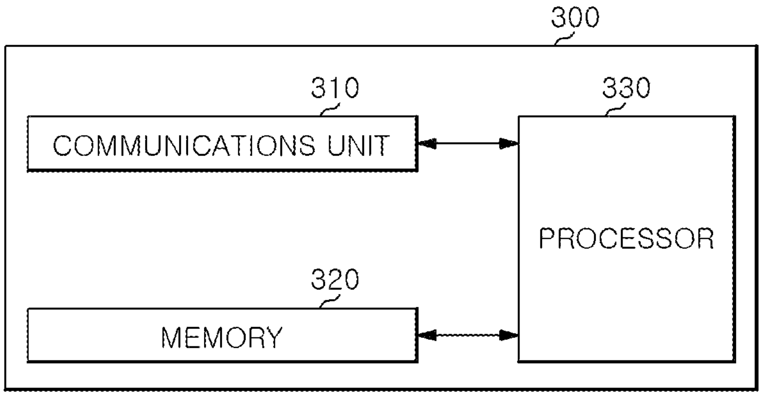
FIG. 4 is a block diagram illustrating a proxy server according to an example.

FIG. 4 is a block diagram illustrating a proxy server according to an example.

Referring to FIG. 4, the proxy server 300 may include a memory 320, a communications unit 310, and a processor 330.

The memory 320 may include any computer-readable storage medium that stores data in a non-transitory form. Thus, the memory 320 may be, for example, RAM, ROM, and/or any other type of storage medium. The memory 320 may have stored therein a variety of information. In some examples, the memory 320 may store a set of instructions that are to be executed by the processor 330. Further, in some examples, the memory 320 may store information for use in accessing or communicating with the additional function provision server 200. This access or communication-related information may include an address or URL of the proxy server 300.

The communications unit 310 may communicate with the additional function provision server 200 and with the image forming apparatus 100. The communications unit 310 may include a variety of communications modules (e.g., transceivers), for example, a wired communications module and/or a wireless communications module. The wired communications module may support LAN, USB, HDMI, or any other suitable type of wired communication technology. The wireless communications module may support Wi-Fi, Wi-Fi Direct, Bluetooth, UWB, LTE, LTE-A, 5G, NFC, or any other suitable type of wireless communication technology.

The processor 330 may execute an instruction stored in the memory 320. The processor 330 may also read other information stored in the memory 320. In addition, the processor 330 may store information in the memory 320 and may update some information stored in the memory 320.

The processor 330 may control an operation of the proxy server 300. In some examples, the processor 330 may be implemented with a CPU or other processing circuitry to perform the example operations described herein.

The processor 330 may process, on behalf of the image forming apparatus 100, a request from the image forming apparatus 100 to access the additional function provision server 200. Such processing may involve the use of information regarding an API supported by the additional function provision server 200, which information may be obtained by the proxy server 300 from the image forming apparatus 100.

In response to receiving a response from the additional function provision server 200, the processor 330 may perform a control operation to forward the response through the communications unit 310 to the image forming apparatus 100.

When the response from the additional function provision server 200 is forwarded to the image forming apparatus 100, the processor 330 may forward, to the image forming apparatus 100, a notification message prompting to establish an updated security scheme of the image forming apparatus 100. As discussed above, a security scheme may refer to a protocol, an encryption scheme, etc. This notification message may be a text or sound message in the form of a simple alarm or otherwise may be a message that prompts for updating of an application or a firmware program of the image forming apparatus 100.

Further, the processor 330 may determine what security scheme is being operated by the additional function provision server 200. In an example, in order to communicate with the additional function provision server 200 over HTTPS, the processor 330 may enter a handshaking stage during which the proxy server 300 verifies the operating security scheme of the additional function provision server 200 and sets the verified security scheme as its agreed-upon security scheme to support. In this way, even after the additional function provision server 200 has a modified or upgraded version of the security scheme, the proxy server 300 will still be able to communicate with the additional function provision server 200.

In other examples, the processor 330 may be periodically notified of the security scheme of the image forming apparatus 100 or the additional function provision server 200 by a notice issued from a certain server. In that case, the notified security scheme may be made available to the proxy server 300.

Figure 5A:
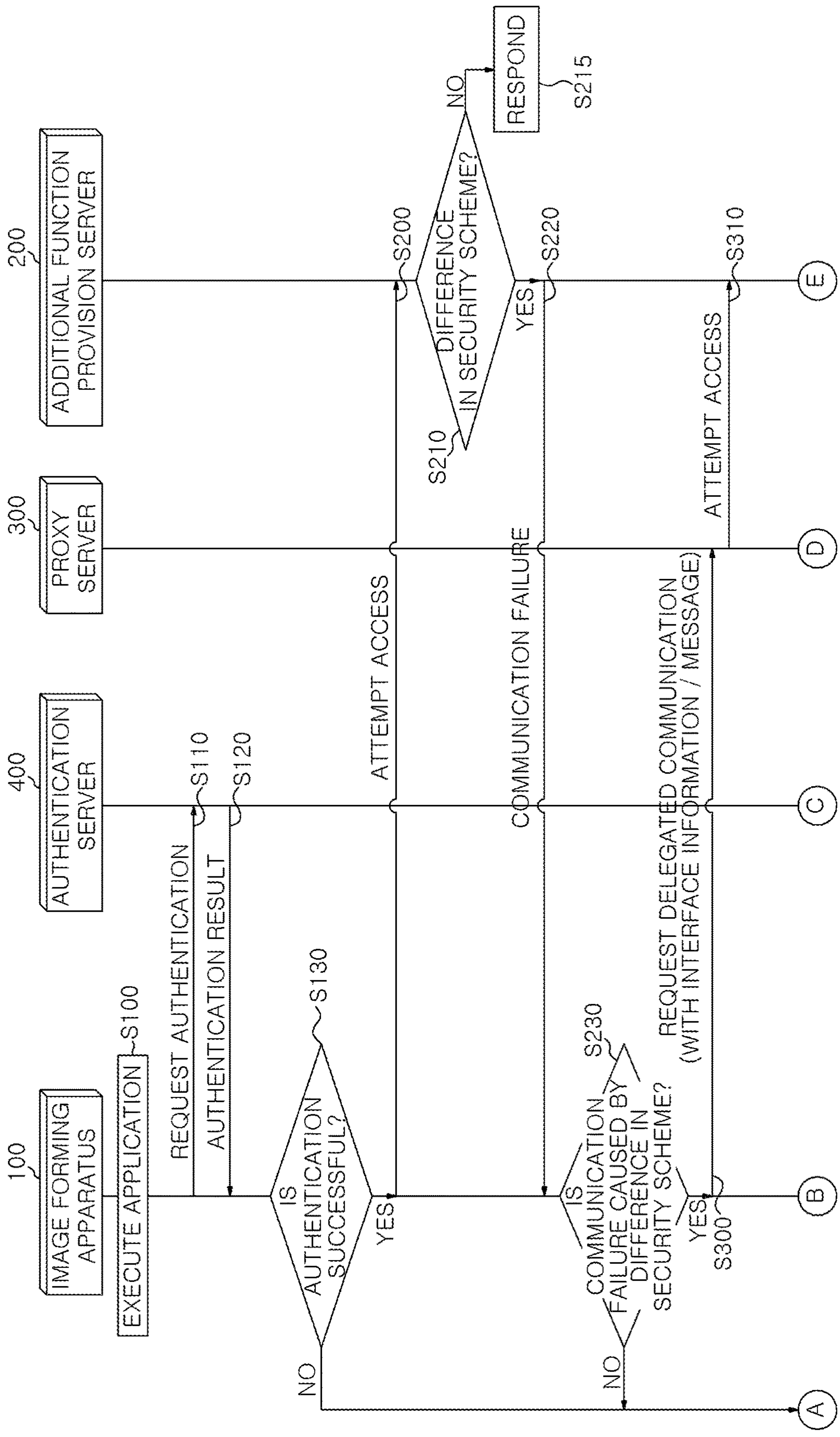
FIGS. 5A and 5B are flow diagrams illustrating communications among an image forming apparatus, an additional function provision server, a proxy server, and an authentication server according to an example.
Figure 5B:
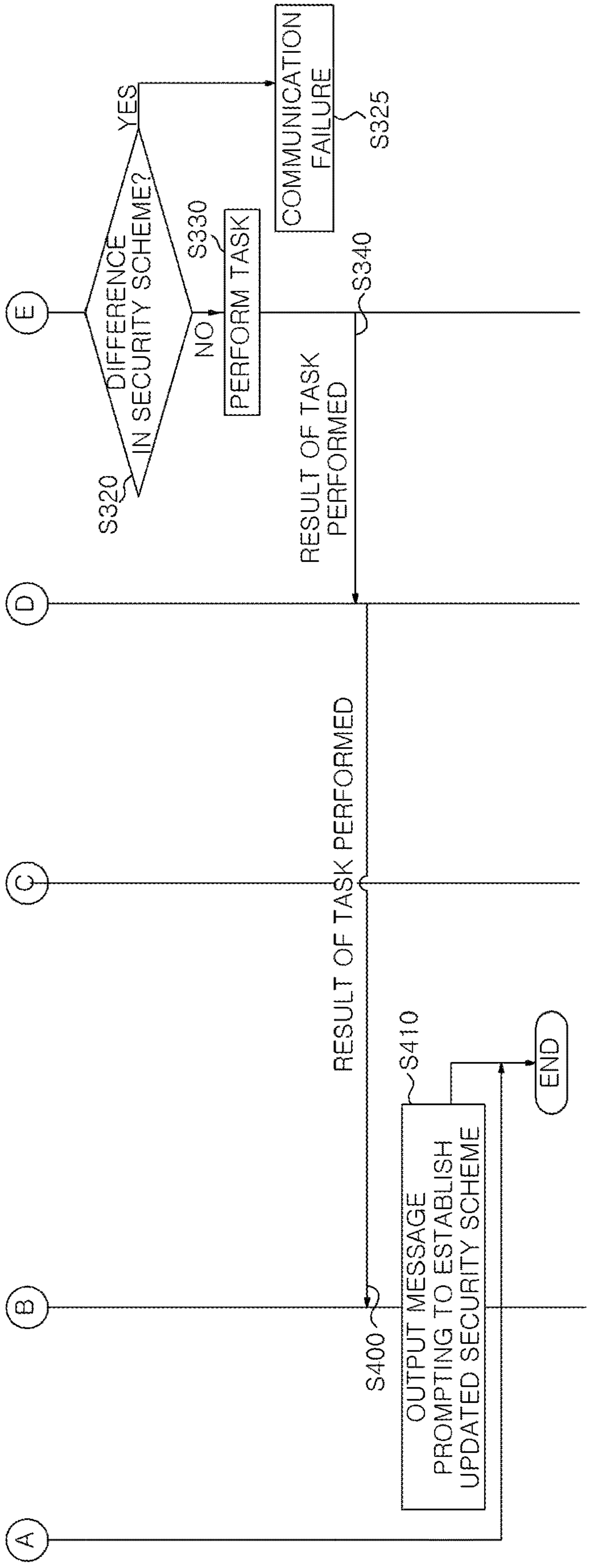

FIGS. 5A and 5B are flow diagrams illustrating communications among an image forming apparatus, an additional function provision server, a proxy server, and an authentication server according to an example. Other example flows are also contemplated.

Referring to FIGS. 5A, the image forming apparatus 100 executes an application in operation S100.

In operation S110, the image forming apparatus 100 requests the authentication server 400 to perform an authentication as to whether the application is a previously authenticated application.

In operation S120, the image forming apparatus 100 receives from the authentication server 400 a result of the requested authentication. In operation S130, the image forming apparatus 100 determines from the authentication result whether the authentication is successful or not. If the authentication is unsuccessful, the execution of the application is terminated. If the authentication is successful, the image forming apparatus 100 attempts to access the additional function provision server 200 in operation S200. In attempting the access, the image forming apparatus 100 may use information regarding an interface, for example, API information.

FIG. 6 shows application programming interface (API) information which may be forwarded from an image forming apparatus to an additional function provision server according to an example.

Referring to FIG. 6, an example is illustrated in which the image forming apparatus 100 attempts, with the URL of the additional function provision server 200, to access the additional function provision server 200 in order to communicate a message "α" together with a header A. The image forming apparatus 100 may use its supported security scheme for the attempted access.

Referring again to FIG. 5A, the additional function provision server 200 determines whether its operating security scheme is different from the security scheme of the image forming apparatus 100 in operation S210. If it is determined that the respective security schemes are not different, the additional function provision server 200 accepts communication with the image forming apparatus 100, performs an operation for the communication, and responds to the image forming apparatus 100 with a result of the operation in operation S215. If it is determined in operation S210 that the respective security schemes are different, the additional function provision server 200 notifies the image forming apparatus 100 of a communication failure in operation S220.

In operation S230, the image forming apparatus 100 determines whether the communication failure is caused by a difference between the respective security schemes. To this end, the image forming apparatus 100 may extract, from the notification of the communication failure, information indicating a cause of the communication failure. If the communication failure is not caused by the security scheme difference, for example, when the additional function provision server 200 is malfunctioning, the execution of the application is terminated. If the communication failure is caused by the security scheme difference, the image forming apparatus 100 requests the proxy server 300 to perform delegated communication with the additional function provision server 200 on behalf of the image forming apparatus 100 in operation S300. For the request, the image forming apparatus 100 may use API information.

FIG. 7 shows API information which may be forwarded from an image forming apparatus to a proxy server according to an example.

Referring to FIG. 7, an example is illustrated in which the image forming apparatus 100 attempts, with the URL of the proxy server 300, to access the proxy server 300 such that a message "α+β," together with a header B, can be communicated to the proxy server 300. For example, this message is assembled from the message α, which is to be forwarded from the image forming apparatus 100 to the additional function provision server 200, and an extra message β, including the method to call the API of the additional function provision server 200, the URL of the additional function provision server 200, and the header A.

Referring again to FIG. 5A, the proxy server 300 attempts, with the information conveyed in operation S300, to access the additional function provision server 200 in operation S310. This attempt may involve a handshaking stage to communicate with the additional function provision server 200 over HTTPS. As described above, during the stage, the proxy server 300 may verify the operating security scheme of the additional function provision server 200 and set the verified security scheme as its agreed-upon security scheme to support. In this way, even after the additional function provision server 200 has a modified or upgraded version of the security scheme, the proxy server 300 will be able to communicate with the additional function provision server 200.

In an example, in order to communicate with the additional function provision server 200, the proxy server 300 may use API information.

FIG. 8 shows API information which may be forwarded from a proxy server to an additional function provision server according to an example.

Referring to FIG. 8, an example is described in which the proxy server 300 attempts, with the URL of the additional function provision server 200, to access the additional function provision server 200 in order to communicate the message "α," which is to be forwarded from the image forming apparatus 100 to the additional function provision server 200, together with the header A.

Referring to FIG. 5B, the additional function provision server 200 determines whether its operating security scheme is different from the security scheme of the proxy server 300 in operation S320. If it is determined that the respective security schemes are different, the additional function provision server 200 notifies the proxy server 300 of a communication failure in operation S325. If it is determined that the respective security schemes are not different, the additional function provision server 200 accepts communication with the proxy server 300 and performs certain tasks for the communication in operation S330. In operation S340, the additional function provision server 200 responds to the proxy server 300 with a result of the tasks.

In operation S400, the proxy server 300 forwards, to the image forming apparatus 100, the result received in operation S340.

In operation S410, the image forming apparatus 100 outputs, from the output unit of its UI unit, a message prompting to establish an updated security scheme of the image forming apparatus 100.

As such, in an example, the image forming apparatus 100 may access the additional function provision server 200 via the proxy server 300 if there occurs a communication failure between the image forming apparatus 100 and the additional function provision server 200, so that the image forming apparatus may be served with an additional function. Hence, a user of the image forming apparatus 100 may seamlessly make use of the additional function, irrespective of whether an upgrade on the additional function provision server 200 is performed.

In addition, if the image forming apparatus 100 indirectly accesses the additional function provision server 200, the user or an administrator of the image forming apparatus 100 may be prompted with an informational notification prompting to establish an upgraded security scheme of the image forming apparatus 100, upon which the additional function provision server 200 may agree as corresponding to its upgraded security scheme. Thus, it is possible to promote efficient maintenance and management of the image forming apparatus 100.

Figure 9:
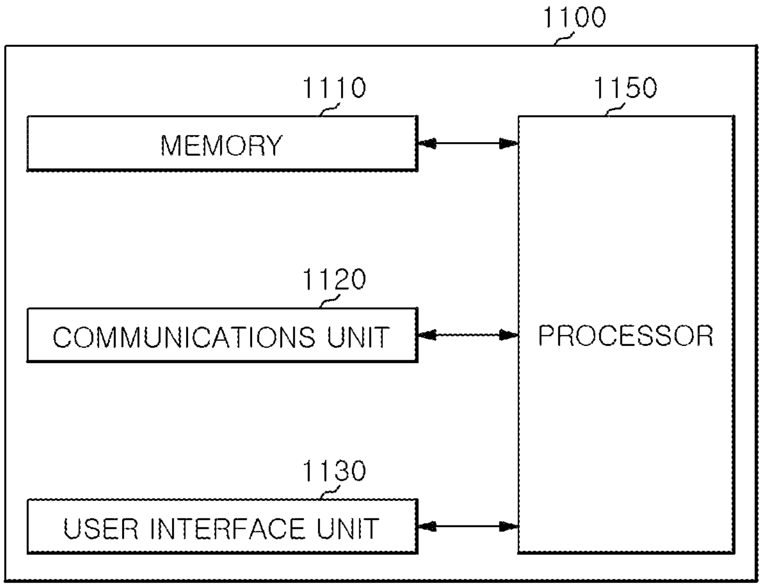
FIG. 9 is a block diagram illustrating a client device according to an example.

FIG. 9 is a block diagram illustrating a client device according to an example.

Referring to FIG. 9, a client device 1100 may include a memory 1110, a communications unit 1120, a UI unit 1130, and a processor 1150, which may perform the same functions as those of the memory 110, the communications unit 120, the UI unit 130, and the processor 150 of FIG. 3, respectively. The client device 1100 may be implemented without functions such as those of the image forming job unit 140 of FIG. 3 or may be implemented using additional components to perform other functions. For further details on the example client device 1100, reference may be made to the above description of the image forming apparatus 100.

Figure 10:
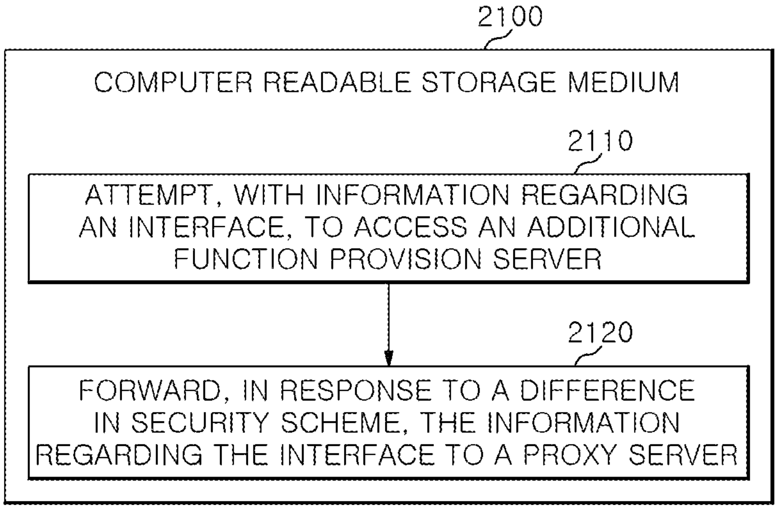
FIG. 10 is a block diagram illustrating a computer readable storage medium that stores a computer program according to an example.

FIG. 10 is a block diagram illustrating a computer readable storage medium that stores a computer program according to an example. When executed by a processor, e.g., the processor 150 of the image forming apparatus 100, the computer program may implement some example operations of the aforementioned methodology.

Referring to FIG. 10, the computer program stored in a computer readable storage medium 2100 may include a set of program instructions 2110 and 2120 that direct the processor to perform example operations.

The instructions 2110 may be to attempt, with information regarding an interface, to access the additional function provision server 200.

The instructions 2120 may be to forward, in response to a difference between a security scheme of the additional function provision server 200 and a security scheme that is used for the attempted access, the information regarding the interface to the proxy server 300, which is to communicate using the operating security scheme of the additional function provision server 200.

For further details on the example operations, reference may be made to the above description of the image forming apparatus 100.

The computer readable storage medium 2100 may be a non-transitory computer readable medium. The term "non-transitory computer readable medium" as used herein refers to a medium that is capable of semi-permanently storing data and is readable by an apparatus, rather than a medium, e.g., a register, a cache, a volatile memory device, etc., that temporarily stores data. For example, the foregoing program instructions may be stored and provided in a CD, a DVD, a hard disk, a Blu-ray disc, a USB, a memory card, a ROM device, or any of other types of non-transitory readable media.

In an example, the methodology disclosed herein may be incorporated into a computer program product. The computer program product may be available as a product for trading between a seller and a buyer. The computer program product may be distributed in the form of a machine-readable storage medium, e.g., compact disc read only memory (CD-ROM), or distributed online through an application store, e.g., PlayStore™. For online distribution, at least a portion of the computer program product may be temporarily stored, or temporarily created, in a storage medium such as a server of the manufacturer, a server of the application store, or a storage medium such as a memory of a relay server.

The foregoing description has been presented to illustrate and describe various examples. It should be appreciated by those skilled in the art that modifications and variations are possible in light of the above teaching. In various examples, suitable results may be achieved if the above-described techniques are performed in a different order, and/or if some of the components of the above-described systems, architectures, devices, circuits, and the like are coupled or combined in a different manner, or substituted for or replaced by other components or equivalents thereof.

Therefore, the scope of the disclosure is not to be limited to the precise form disclosed, but rather defined by the following claims and equivalents thereof.

What is claimed is:

1. An image forming apparatus, comprising: a communications unit to communicate with an additional function provision server utilizing data encryption defined by a first security scheme; a memory to store information regarding an interface through which the additional function provision server is made accessible to provide an additional function, wherein the information is encrypted utilizing the first security scheme; and a processor to: attempt, with the information regarding the interface, to access the additional function provision server using the first security scheme of the image forming apparatus; determine there is a communication failure caused by a difference between the first security scheme of the image forming apparatus and a second security scheme of the additional function provision server; and wherein the difference between the first security scheme and the second security scheme occurs when: a protocol of the second security scheme of the additional function provision server is different in type from a protocol of the first security scheme of the image forming apparatus or the protocol of the second security scheme of the additional function provision server is different in version from the protocol of the first security scheme of the image forming apparatus; and in response to determining there is a communication failure caused by the difference between the first and second security schemes, forward the information regarding the interface via the communications unit to a proxy server which is to communicate the information to the additional function provision server using a second security scheme of the additional function provision server, if there is a difference between the first security scheme of the image forming apparatus and the second security scheme of the additional function provision server.

2. The image forming apparatus of claim 1, wherein, if there is the difference between the security scheme of the image forming apparatus and the security scheme of the additional function provision server, the processor is to forward a message for the additional function provision server to the proxy server.

3. The image forming apparatus of claim 1, wherein the information regarding the interface comprises information regarding an application programming interface (API) supported by the additional function provision server and wherein the information regarding the API comprises an API call method and an address of the additional function provision server.

4. The image forming apparatus of claim 1, wherein the memory is to store an address of the proxy server, and wherein the processor is to communicate, using the address of the proxy server, with the proxy server to forward the information to the proxy server.

5. The image forming apparatus of claim 1, wherein the processor is to block the access to the additional function provision server if the access is attempted with execution of an unauthenticated application.

6. The image forming apparatus of claim 5, wherein the processor is to receive, from an external authentication server through the communications unit, a notification as to whether the access is attempted with execution of the unauthenticated application.

7. The image forming apparatus of claim 1, further comprising a user interface unit, wherein the user interface unit is to output a message prompting to establish an updated security scheme of the image forming apparatus if a response to the attempted access is received from the additional function provision server through the proxy server.

8. A non-transitory computer readable storage medium having a computer program stored thereon for controlling an image forming apparatus, the computer readable storage medium comprising: instructions to obtain information regarding an interface through which an additional function provision server is made accessible to provide an additional function, wherein the information is encrypted utilizing a first security scheme of the image forming apparatus; instructions to attempt, with the information regarding the interface, to access the additional function provision server using the first security scheme of the image forming apparatus; instructions to determine there is communication failure, caused by a difference between the first security scheme of the image forming apparatus and a second security scheme of the additional function provision server; and wherein the difference between the first security scheme and the second security scheme occurs when: a protocol of the second security scheme of the additional function provision server is different in type from a protocol of the first security scheme of the image forming apparatus or the protocol of the second security scheme of the additional function provision server is different in version from the protocol of the first security scheme of the image forming apparatus; and instructions to forward the information regarding the interface to a proxy server, which is to communicate the information to the additional function provision server using the second security scheme of the additional function provision server, if there is a difference between the security scheme of the image forming apparatus and a security scheme of the additional function provision server.

9. A proxy server, comprising: a communications unit to communicate with a client device and an additional function provision server using respective security schemes; and a processor to: receive a request from the client device for delegated communication with the additional function provision server, wherein the request was originally destined for the additional function provision server utilizing data encryption defined by a first security scheme, and the request is received in response to a communication failure caused by a difference in the first security scheme and a second security scheme of the additional function provision server;

wherein the difference between the first security scheme and the second security scheme occurs when: a protocol of the second security scheme of the additional function provision server is different in type from a protocol of the first security scheme of the client device or the protocol of the second security scheme of the additional function provision server is different in version from the protocol of the first security scheme of the client device; obtain information regarding an interface through which the additional function provision server is made accessible to provide an additional function for the client device; process on behalf of the client device, using the obtained information regarding the interface, the request from the client device to access the additional function provision server utilizing a second security scheme; and forward a response to the request from the additional function provision server to the client device.

10. The proxy server of claim 9, wherein the information regarding the interface comprises information regarding an application programming interface (API) supported by the additional function provision server.

11. The proxy server of claim 10, wherein the information regarding the API comprises an API call method and an address of the additional function provision server.

12. The proxy server of claim 9, wherein the processor is to forward to the client device a message prompting to establish an updated security scheme of the client device if the response to the request is forwarded to the client device from the additional function provision server.

* * * * *